Dec. 12, 1950 — O. R. ROWE ET AL — 2,533,962
PRUNING IMPLEMENT
Filed Aug. 2, 1949 — 3 Sheets-Sheet 1
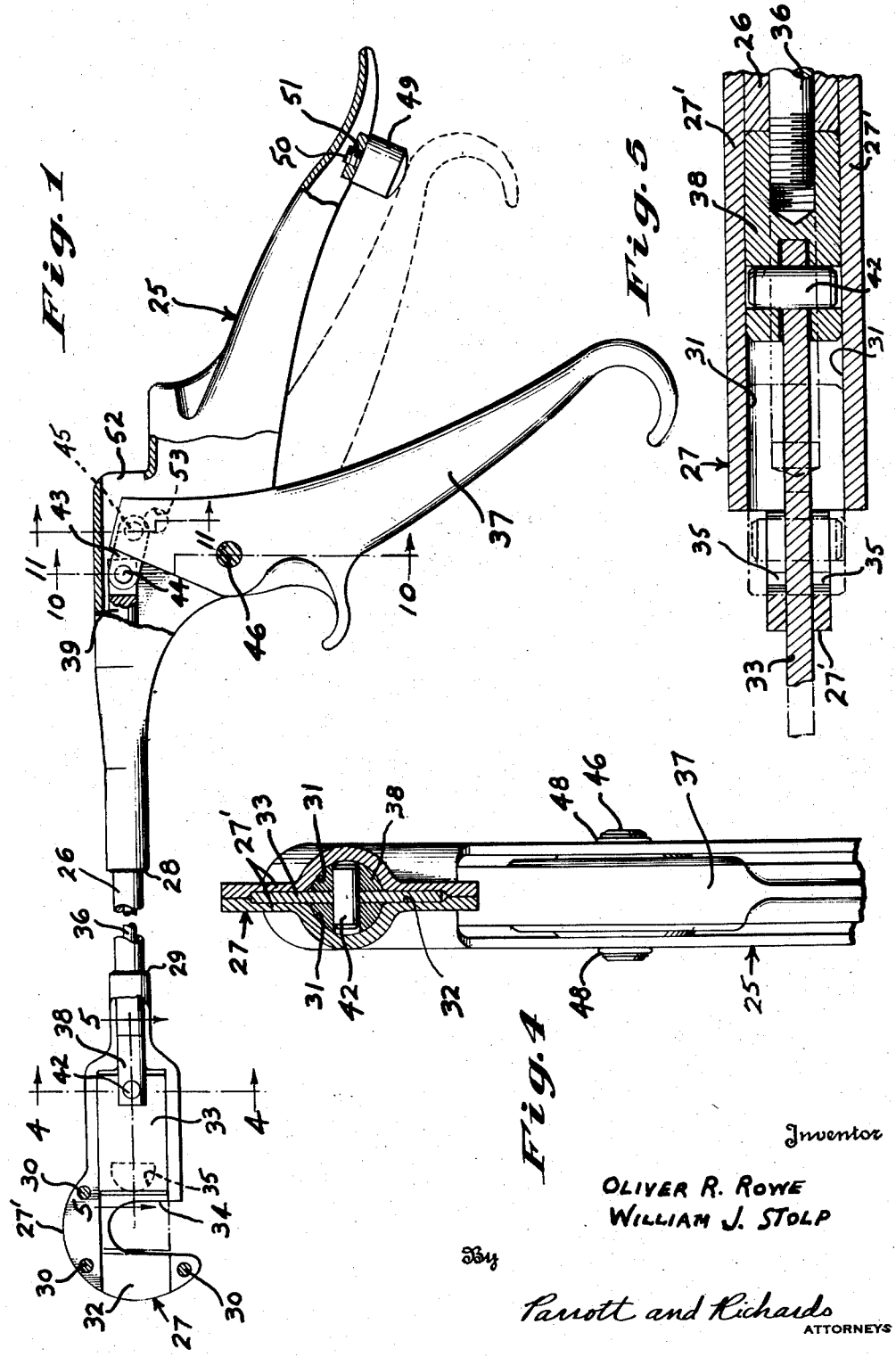
Inventor
OLIVER R. ROWE
WILLIAM J. STOLP
By Parrott and Richards
ATTORNEYS

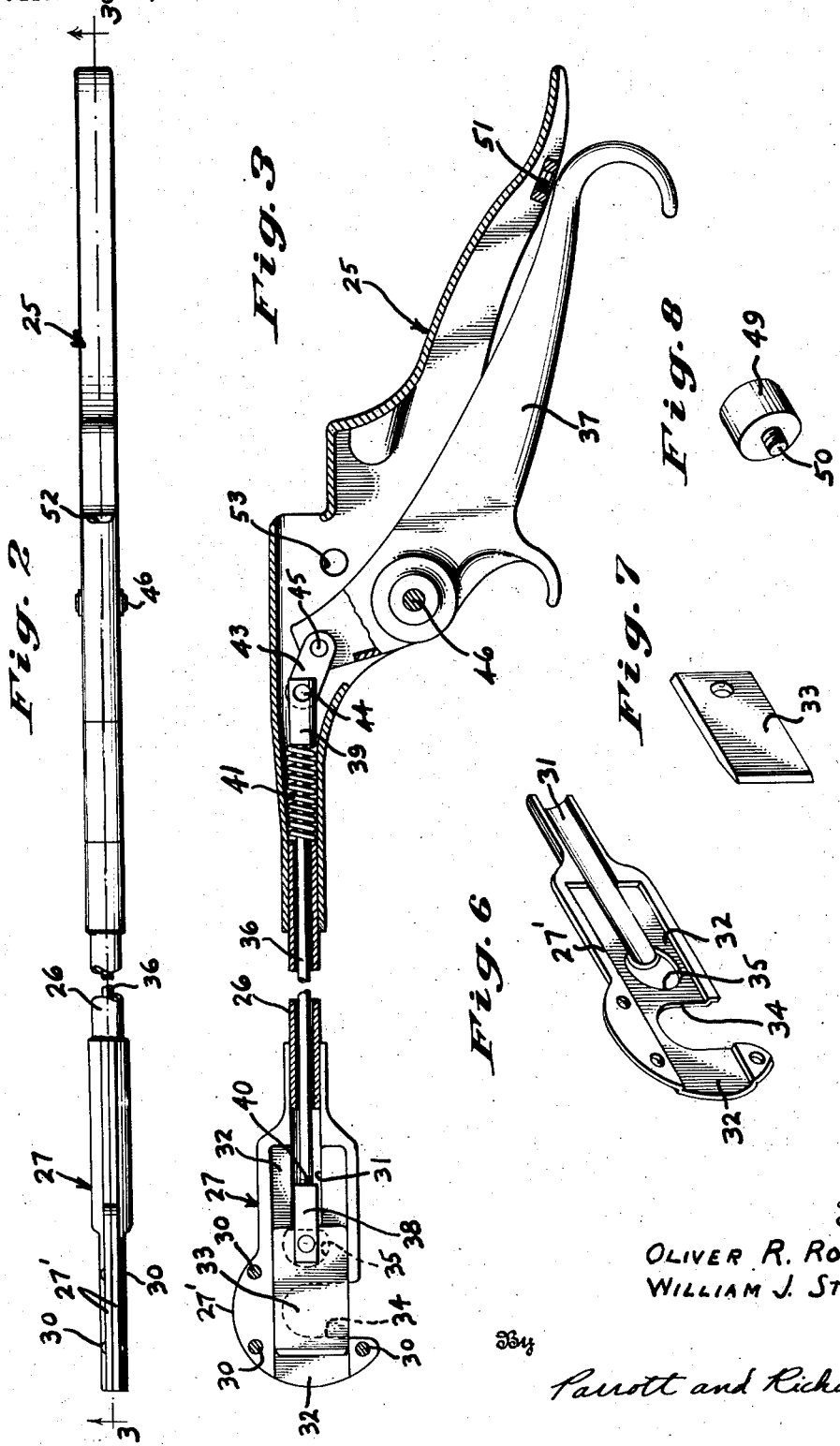

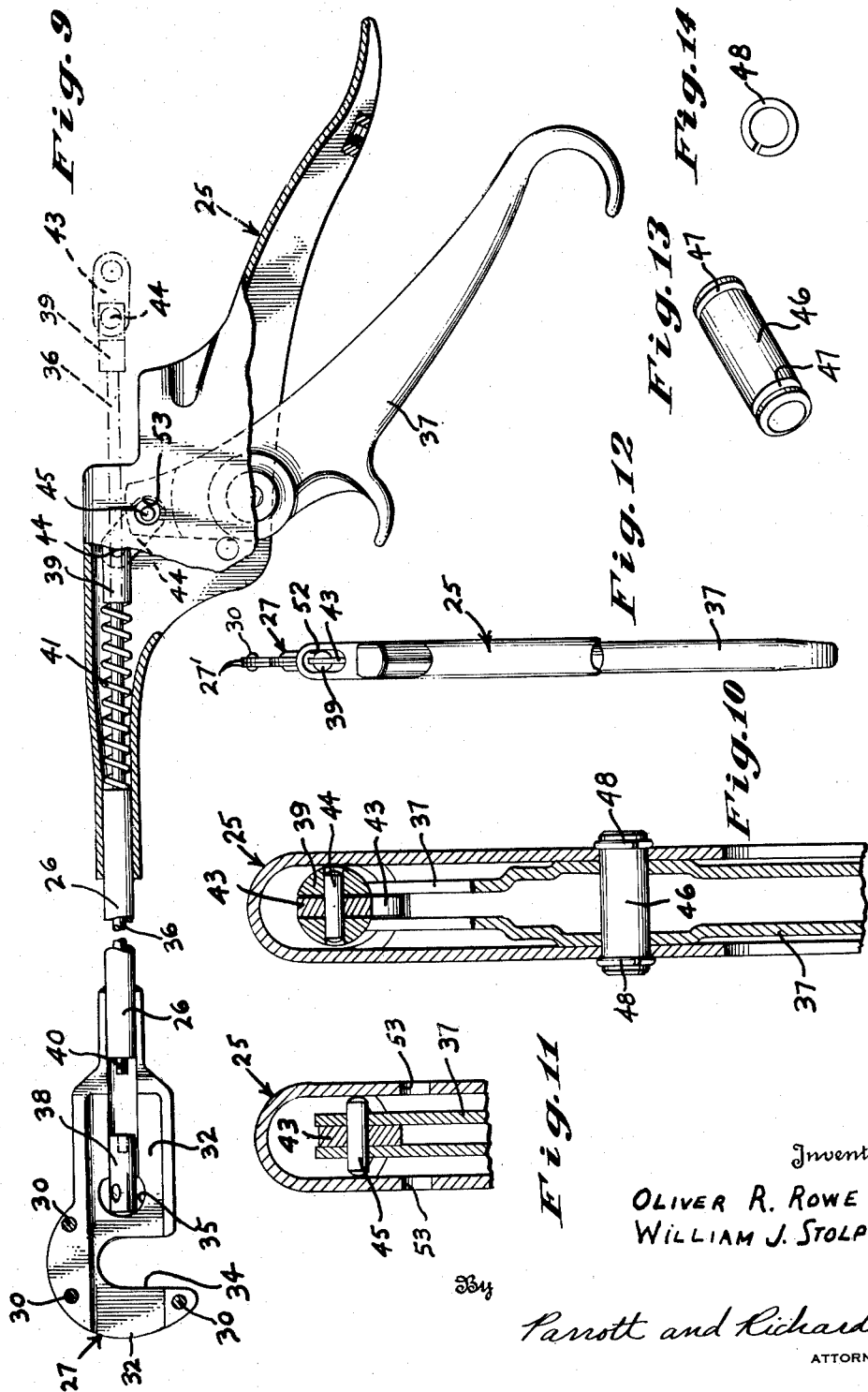

Patented Dec. 12, 1950

2,533,962

UNITED STATES PATENT OFFICE 2,533,962

PRUNING IMPLEMENT

Oliver R. Rowe and William J. Stolp, Charlotte, N. C., assignors to R. H. Bouligny, Inc., a corporation of North Carolina Application August 2, 1949, Serial No. 108,156

1 Claim. (Cl. 30—242)

This invention relates generally to pruning implements, and more particularly to pruning implements of the type having a handle portion from which a tubular housing extends to contain an actuating rod coupled to a cutter blade disposed for operation in a cutterhead supported at the extending end of the tubular housing, and in which a lever member is pivoted on the handle portion and connected to the actuating rod for operating the cutter blade. A pruning implement of this type is illustrated and described in U. S. Patent 2,184,332, issued January 20, 1942, to Henri B. Bernay.

One of the important practical difficulties encountered in the manufacture of such pruning implements is the problem of arranging the cutter blade so that it may be removed and installed easily whenever it needs sharpening or replacement. These implements are often used by persons who have little or no mechanical ability so that the arrangement for removing and replacing the cutter blade must be extremely simple to be satisfactory. For the same reason, and also to facilitate manufacture of the pruning implements, it is likewise important to keep the arrangement for securing the operating elements in assembled relation as simple as possible.

According to the present invention an exceptionally advantageous solution of these problems is provided by employing the pivot mounting for the operating lever on the handle portion as the sole means for securing all of the operating elements for the pruning implement in assembled relation. In addition, the cutter blade is made easily replaceable by arranging a removable stop member on the handle portion which normally limits pivoting movement of the operating lever so that the coupling of the cutter blade to the actuating rod is always maintained within the above mentioned tubular housing during use of the pruning implement, but with the stop member disposed so that upon its removal from the handle portion further pivoting movement of the operating lever is allowed to extend the cutter blade coupling beyond the tubular housing and thereby provide easy access to the coupling for removal of the cutter blade.

These and other features of the pruning implement of the present invention are described further below in connection with the accompanying drawings, in which:

Fig. 1 is a side elevation, partly broken away, of a pruning implement arranged in accordance with the present invention;

Fig. 2 is a top plan view corresponding generally to Fig. 1;

Fig. 3 is a longitudinal section taken substantially on the line 3—3 in Fig. 2;

Fig. 4 is an enlarged sectional detail taken substantially on the line 4—4 in Fig. 1;

Fig. 5 is a similar sectional detail taken substantially on the line 5—5 in Fig. 1;

Fig. 6 is a perspective view illustrating the arrangement of the cutterhead;

Fig. 7 is a perspective view of the cutter blade;

Fig. 8 is a perspective view of the stop member;

Fig. 9 is a further side elevation, partly broken away and partly in section, illustrating the assembly arrangement for the operating elements of the pruning implement;

Fig. 10 is an enlarged sectional detail taken substantially on the line 10—10 in Fig. 1;

Fig. 11 is a similar sectional detail taken substantially on the line 11—11 in Fig. 1;

Fig. 12 is a right end elevation corresponding to Fig. 1;

Fig. 13 is a perspective view of the pivot pin employed for mounting the operating lever on the handle portion; and Fig. 14 is a perspective view of the retaining rings used for securing the pivot pin shown in Fig. 13 in place.

Referring now in detail to the drawings, and more particularly at first to Fig. 1, the pruning implement shown is of the same general type disclosed in the Bernay Patent 2,184,332 referred to above. In Fig. 1, the handle portion of the pruning implement is indicated by the reference numeral 25, the tubular housing by the reference numeral 26, and the cutterhead by the reference numeral 27.

The tubular housing 26 is secured permanently at one end in the handle portion 25 by soldering or the like as indicated at 28, and carries the cutterhead 27 likewise permanently fixed in place at its other extending end as indicated at 29. The cutterhead 27 is composed of complementary halves 27' (compare Fig. 6) which are assembled by rivets or the like, as at 30, for disposition on the tubular housing 26. Each complementary half 27' of the cutterhead 27 is grooved as shown at 31 for fitting on the tubular housing 26, and in effect forming a continuation of this housing; and each half 27' is further grooved as shown at 32 to provide a guideway for a cutter blade 33. This groove 32 forming the guideway for the cutter blade 33 is notched as at 34 to provide a throat in the cutterhead 27, and the first mentioned groove 31 terminates at an access opening 35 in the groove 32 to provide for removal and replacement of the cutter blade 33 as will be explained more in detail presently.

Inside the tubular housing 26 an actuating rod 36 is contained, which actuating rod 36 is coupled at one end to the cutter blade 33 and connected at its other end to a lever member 37 pivoted on the handle portion 25 for operating the cutter blade 33. For this purpose each end of the actuating rod 36 is fitted with a clevis member as at 38 and 39. The clevis member 38 at the cutterhead end of the actuating rod 36 is removably assembled on the actuating rod 36 by screw threads, as at 40 (compare Figs. 3 and 5), and the clevis member 39 at the handle end of the actuating rod 36 may be similarly assembled if desired, although preferably it is permanently fixed in place on the actuating rod 36. This arrangement of at least one of the clevis members, as 38, for assembly on the actuating rod 36 by screw threads provides an easy means for adjustment of the depth of travel of the cutter blade 33 in the cutterhead 27. Also it should be noted that the arrangement of the cutter blade 33 in the cutterhead 27 prevents the clevis member 38 from turning on the actuating rod 36 and thereby makes it unnecessary to provide any separate locking means for the clevis member 38. With the clevis members 38 and 39 in place, it will be seen that they function as stops to limit the displacement of the actuating rod 36 in the tubular housing 26. A compression spring 41 is disposed over the actuating rod 36 between the clevis member 39 and the handle end of the tubular housing 26 so that normally the actuating rod 36 is maintained in full retracted position with the clevis member 38 bearing on the extending end of the tubular housing 26 and the cutter blade 33 disposed in the cutterhead 27 below the throat 34. The spring 41 and clevis member 39 are disposed, however, to allow sufficient displacement of the actuating rod 36 so that the cutter blade 33 may be moved in the cutterhead 27 across the throat 34 for the cutting operation as indicated by dotted lines in Fig. 1.

For coupling the cutter blade 33 to the actuating rod 36, the cutter blade 33 and clevis member 38 are both formed to receive a dowel pin 42, which is positively retained in place only so long as the coupling is maintained within the tubular housing 26, as is pointed out further below. The connection of the actuating rod 36 at its other end to the operating lever 37 is effected by means of a link member 43 which is joined to the clevis member 39 and to one end of the operating lever 37, respectively, by dowel pins at 44 and 45, which dowel pins are similarly retained in place only by the covering relation of the handle portion 25 at this point.

The operating lever 37 is pivoted on the handle portion 25 intermediately of its ends as indicated in the drawings by a pivot pin 46. A suitable pivot pin 46 for this purpose is shown in Fig. 13 formed with circumferential grooves 47 at each end to receive snap rings 48 (see Fig. 14) for securing it in place. In any case, the pivoted mounting of the lever member 37 on the handle portion 25 constitutes, as previously mentioned, the sole means employed according to the present invention for securing the operating elements of the pruning implement in assembled relation, so that any pivot pin 46 used should be provided with securing means.

The handle portion 25 and lever member 37 are adapted in form, as illustrated in the drawings, to provide a hand grip for operating the pruning implement, these members being associated to be held easily in the nature of a pistol in one hand so that pressure may be exerted by the fingers on the free end of the lever member 37 and thereby pivot it toward the handle portion 25. As will be seen, this pivoting movement of the lever member 37 will result in displacement of the actuating rod 36 to move the cutter blade 33 forward in the cutterhead 27 for the cutting operation.

It has previously been pointed out that the dowel pin 42 coupling the cutter blade 33 to the actuating rod 36 is positively held in place only because of being contained within the tubular housing 26, or the grooves 31 in the cutterhead 27 which form a continuation of this housing. Accordingly, to insure retaining the dowel pin 42 positively in assembled relation, the handle portion 25 is fitted with a stop member 49. This stop member 49 may consist of a resilient body formed of rubber or the like fitted with a stud 50 adapted to engage a threaded opening provided in the handle portion as at 51. In this manner the stop member 49 may be removably disposed on the handle portion 25 to limit normally the pivoting movement of the lever member 37 so that the dowel pin 42 coupling the cutter blade 33 to the actuating rod 36 is always maintained within the tubular housing 26, or the grooves 31, during use of the pruning implement.

It will be noted, however, that upon removal of the stop member 49 from the handle portion 25 further pivoting movement of the lever member 37 is allowed (compare Fig. 3), which further pivoting movement makes it possible to extend the actuating rod 36 beyond the tubular housing 26, or grooves 31, and thereby expose the dowel pin 42 at the access openings 35 in the cutterhead 27 so that it may be removed to permit removal of the cutter blade 33 for sharpening or replacement. When the dowel pin is removed in this manner, the cutter blade is released so that it may be readily slipped out of the forward end of the guideway formed by the grooves 32 in the cutterhead 27, and the procedure is simply reversed when the cutter blade 33 is ready to be replaced. This may all be done without taking down or disturbing any of the other operating elements of the pruning implement.

On the other hand, if it is desired for any reason to disassemble the operating elements further, the next step is to unscrew the clevis member 38 at the cutterhead end of the actuating rod 36 (compare Fig. 9), which will release the actuating rod 36 at its forward end so that it may be withdrawn rearwardly from the handle portion 25 through an open portion provided at 52 (compare Fig. 12) for this purpose. Before this may be done, however, the connecting link 43 at the rear end of the actuating rod 36 must be released from the lever member 37. This is done by removing pivot pin 46 and shifting the lever member 37 until the dowel pin 45 is exposed at open portions or access openings 53 provided in the handle portion 25. These access openings 53 are arranged in the handle portion 25 so that they do not fall in the arc traced by the dowel pin 45 during pivoting movement of the lever member 37, so that the dowel pin 45 cannot be removed as long as the lever member 37 is pivotally assembled on the handle portion 25. With the pivot pin 46 removed, however, access to the dowel pin 45 may be easily had to release the actuating rod 36 completely for removal as indicated by dotted lines in Fig. 9.

The above described arrangement of the pruning implement of the present invention not only provides for easy and simple handling of the pruning implement during use but also facilitates assembly during manufacture in a particularly advantageous manner.

We claim:

In a pruning implement having a tubular housing, an actuating rod arranged therein, a handle fixed to one end of the tubular housing, a cutter head fixed to the other extending end of the tubular housing, a cutter blade positioned in the cutterhead and coupled to the actuating rod, an operating lever pivotally mounted on the handle and connected to the actuating rod for operating the cutter blade, and a stop member removably mounted on the handle for arresting the pivoting movement of the operating lever in the cutting operation so that the coupling of the blade is always maintained within the tubular housing during use of the pruning implement, said cutterhead being formed with access openings beyond the extending end of the tubular housing, said cutter blade being coupled to said actuating rod by a removably disposed dowel pin, and said stop member being disposed so that upon its removal from the handle portion further pivoting movement of the operating lever is allowed to extend the blade coupling beyond the tubular housing and thereby provide for access to said dowel pin through said cutterhead access openings for removal of the cutter blade.

OLIVER R. ROWE.
WILLIAM J. STOLP.

REFERENCES CITED

The following references are of record in the file of this patent:

UNITED STATES PATENTS

| Number | Name | Date |
|---|---|---|
| 57,817 | Evans et al. | Sept. 4, 1866 |
| 1,197,430 | Barnes et al. | Sept. 5, 1916 |
| 2,270,495 | Bernay | Jan. 20, 1942 |
| 2,329,387 | Brenning | Sept. 14, 1943 |